(12) United States Patent
Bauldock, Sr.

(10) Patent No.: US 6,872,078 B1
(45) Date of Patent: Mar. 29, 2005

(54) TEACHING CYLINDER INSTRUMENT

(75) Inventor: Gerald Bauldock, Sr., 16 Meadowbrook Pl., Willingboro, NJ (US) 08046

(73) Assignee: Gerald Bauldock, Sr., Willingboro, NJ (US)

( * ) Notice: Subject to any disclaimer, the term of this patent is extended or adjusted under 35 U.S.C. 154(b) by 0 days.

(21) Appl. No.: 10/707,239

(22) Filed: Nov. 30, 2003

(51) Int. Cl.$^7$ .............................................. G09B 23/04
(52) U.S. Cl. ...................... 434/206; 434/188; 434/211; 434/213; 434/215
(58) Field of Search ............................... 434/206, 215, 434/211, 213

(56) References Cited

U.S. PATENT DOCUMENTS

| 595,455 | A | * | 12/1897 | Glidden | .................... | 434/213 |
| 3,775,868 | A | * | 12/1973 | Daniel | ........................ | 434/259 |

* cited by examiner

Primary Examiner—Derris H. Banks
Assistant Examiner—Dmitry Suhol

(57) ABSTRACT

A device that teaches the relationship between a cylinder's surface areas and volume, its diameter and radius, the top circle circumference and area, the arc length, the sector area, the volume of a slice, the front area of the slice and the side area of the slice. The device includes a transparent hollow outer half-cylinder, and a solid inner half-cylinder that can rotates around a common center for both the inner and outer half-cylinders. The outer half-cylinder has marked off units around the 180 degrees of the half-cylinder. The equations of arc length and sector area along with examples of their meanings are shown on the top half circle. The inner half-cylinder also has marked off units around the 180 degrees of the half-cylinder. The equations for volume of a slice, the front surface area of the slice, and the side surface area of the slice are shown. By revolving the inner cylinder, a slice of the cylinder is exposed allowing the arc length, the sector area, the volume of the slice, and the front surface area of the slice to be calculated. By varying the amount of the slice that is exposed, calculating the values of the arc length, the sector area, the volume of the slice, and the front surface area can be practiced for different size slices. Individual slices can be attached to the inner half-cylinder to make a complete 360-degrees cylinder.

6 Claims, 6 Drawing Sheets

US 6,872,078 B1

TEACHING CYLINDER INSTRUMENT

BACKGROUND OF INVENTION

1) Field of the Invention

The invention relates to devices that teach the relationship between a cylinder's surface areas and volume, its diameter and radius, the top circle circumference and area, the arc length, the sector area, the volume of a slice, the front area of the slice and the side area of the slice.

Across the nation, schools are going through a major reform in their math and science curriculum to bring education standards up to par. The facts show that there is an achievement gap between blacks and whites in mathematics and science. In 1999, when the latest National Assessment of Education Progress (NAEP) test was administered, large differences remained between average scores for blacks and Hispanics on the one hand, versus whites and Asians on the other. Nationally, the achievement gap did not narrow at all during the 1990s. In reading and math, gaps separating poor and minority students from others actually widened at most grade levels and remained the same or dropped only slightly at others (The Education Trust). By the end of grade 4, African American, Latino and poor students of all races are already about two years behind other students. By the time they reach grade 8, they are about three years behind. By the time they reach grade 12, if they do so at all, minority students are about four years behind other young people. The mathematics and science skills of 17-year-old African American and Latino students are similar to those of 13-year-old white students. African Americans and Latinos obtain college degrees at only half the rate of white students. The partnerships between government agency, industry, academia and private organizations are trying to address these issues along with many others. This invention provides a method for teaching the geometric concepts of a cylinder and the equations involved.

2) Prior Art

The prior art consists of teaching the theory and equations for the geometry of a cylinder and its parts. Lessons primarily consist of a mathematical explanation for the following: 1) The circumference of a circle $C=\pi D$ or $C=2\pi r$, 2) The area of a circle $A=\pi r^2$, 3) The arc length$=2\pi r\theta/360$, 4) The sector area$=\pi r^2\theta/360$, 5) The volume of a cylinder$=\pi r^2 L$, 6) The volume of a slice$=\pi r^2 L\theta/360$, 7) The front surface area of a cylinder is $2\pi rL$, 8) The front surface area of a slice$=2\pi rL\theta/360$, 9) And the side surface area of a slice$=rL$.

The present invention, as distinguished from the prior art, provides a device that clearly demonstrates the relationship between a cylinder, its diameter and radius, the arc length, the sector area, the volume of a slice, the front area of the slice and the side area of the slice. None of the prior art uses a device or tool that includes a hollow outer half-cylinder, and a solid inner half-cylinder that can rotates around a common center for both the inner and outer half-cylinders. And none of the prior art contains individual slices that can be attached to the inner half cylinder to complete a full 360 degrees cylinder.

SUMMARY OF INVENTION

The present invention is designed to teach the relationship between a cylinder's surface areas and volume, its diameter and radius, the top circle circumference and area, the arc length, the sector area, the volume of a slice, the front area of the slice and the side area of the slice.

One of the objectives of the present inventions is to provide a device that will bring the level of learning and understanding of a cylinder's geometry and its equations to a conceptual level rather than just a fact remembering level as described in the Blooms Taxonomy.

Another objective is to clearly teach the basic equations of a cylinder's top circle surface area and circumference, its front surface area, its volume and the relationship to the arc length, the sector area, and the areas and volume of a slice.

Another objective is to clearly show how the ratio of $\theta/360$ is common to determining values for the arc length, the sector area, the volume of a slice and the front surface area of a slice.

Another objective is to clearly show that the arc length is a fraction of the total circumference and that the fraction is determined by $\theta/360$.

Another objective is to clearly show that the sector area is a fraction of the total area of a circle and that the fraction is determined by $\theta/360$.

Another objective is to clearly show that the volume of a slice is a fraction of the volume of the cylinder and that the fraction is determined by $\theta/360$.

Another objective is to clearly show that the front surface area of a slice is a fraction of the outer surface area of the cylinder and that the fraction is determined by $\theta/360$.

DETAILED DESCRIPTION

The present invention is designed to teach the relationship between a cylinder's surface areas and volume, its diameter and radius, the top circle circumference and area, the arc length, the sector area, the volume of a slice, the front area of the slice and the side area of the slice.

Figure 1A:
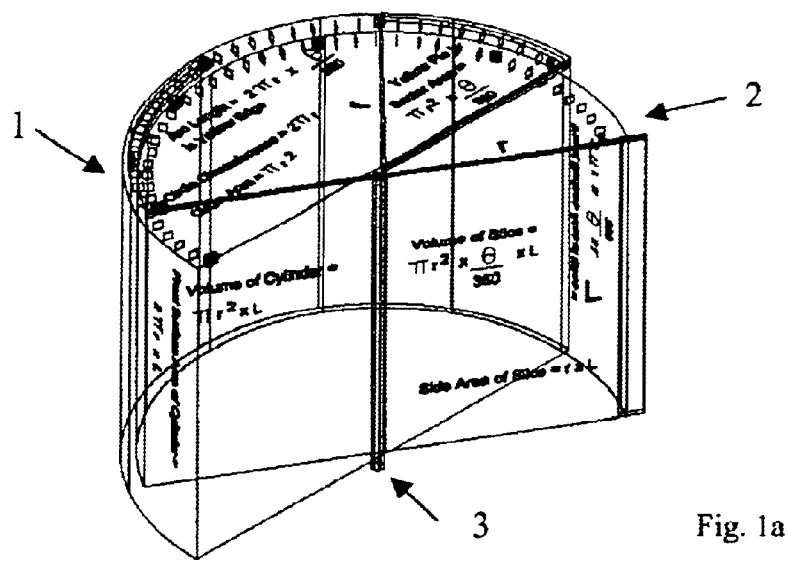
FIG. 1 is a plan view of the invention which includes a transparent hollow outer half-cylinder, and a solid inner half-cylinder that can rotates around a common center for both the inner and outer half-cylinders.
Figure 1B:
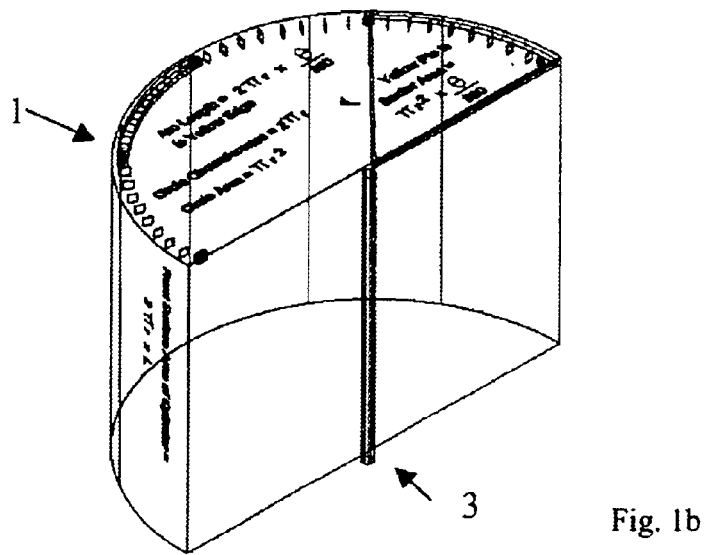
Figure 1C:
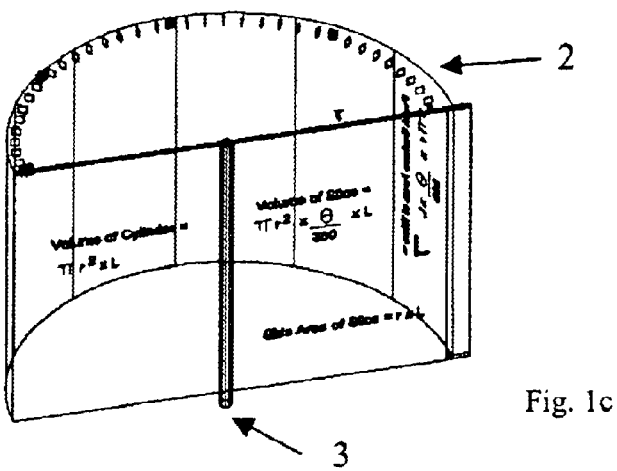
Figure 2:
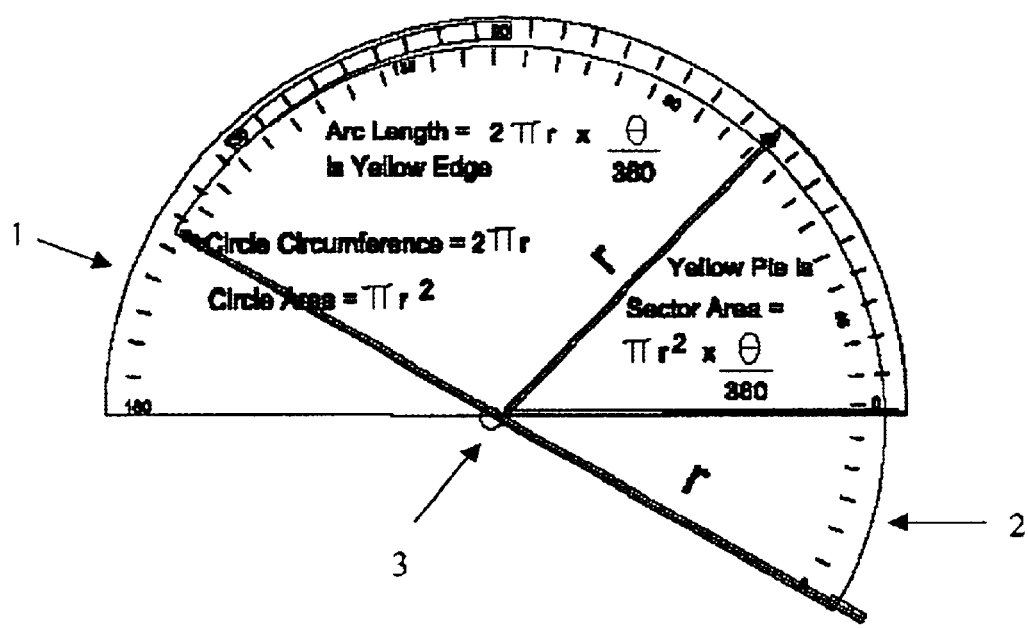
FIG. 2 is a top view of the inner and outer half-cylinders of the invention.

Referring to FIG. 1, the device includes a transparent hollow outer half-cylinder, and a solid inner half-cylinder. The inner half-cylinder can rotate around a common center for both the inner and outer half-cylinders. The outer half-cylinder has marked off units around the 180 degrees of the half-cylinder. The equations for the circle's circumference and area, the arc length and sector area are shown on the top half circle. The arc length and sector area are color coded to clearly identify what they are referring to. The radius (r) of the circle is identified. The inner half-cylinder also has marked off units around the 180 degrees of the half-cylinder. The equations for the volume of the cylinder and of a slice, the front surface area of the slice, and the side surface area of the slice are shown. The radius (r) and the height of the cylinder (L) are identified.

Figure 3A:
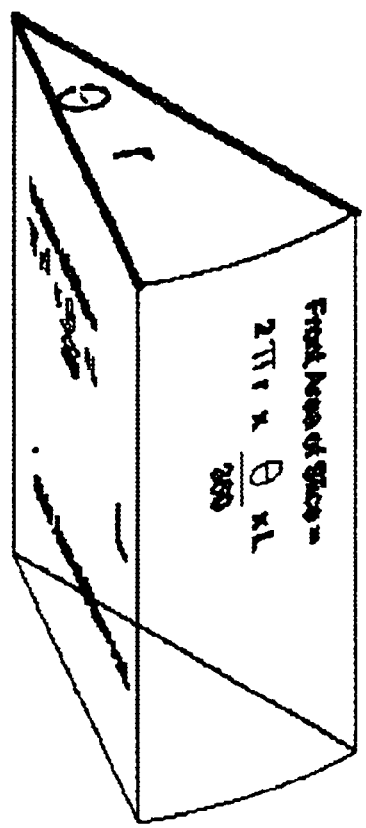
FIG. 3 is a front and side view of an individual slice showing the equations for the volume, front surface area and the side surface area.
Figure 3B:
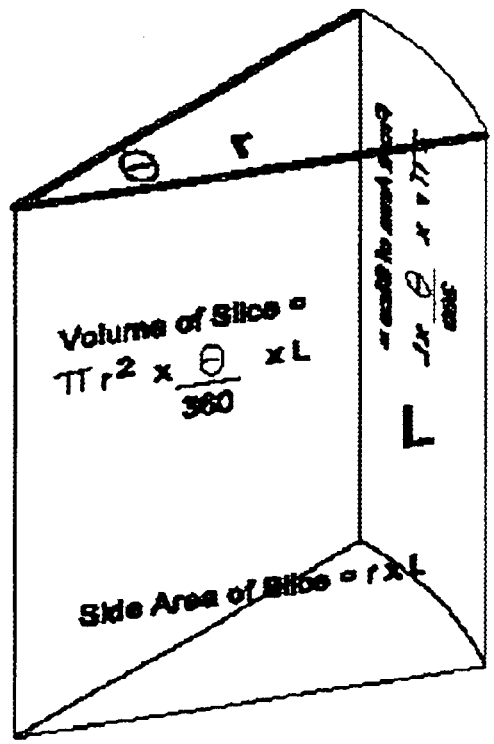
Figure 4A:
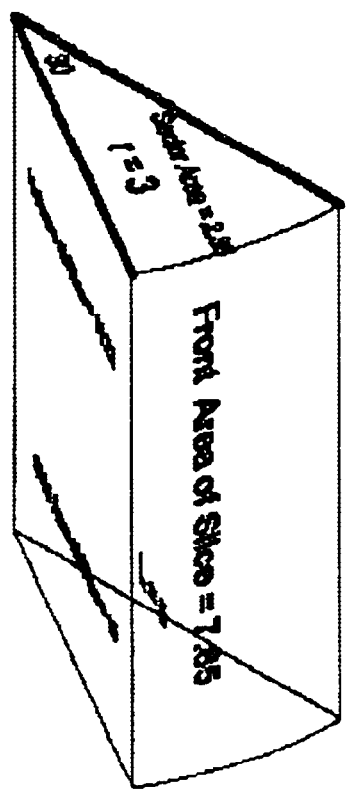
FIG. 4 is a front and side view of a slice with an angle of 30 degrees. Numerical values are given for each surface area, arc length, and volume for a radius of 3 and a length of 5 as examples.
Figure 4B:
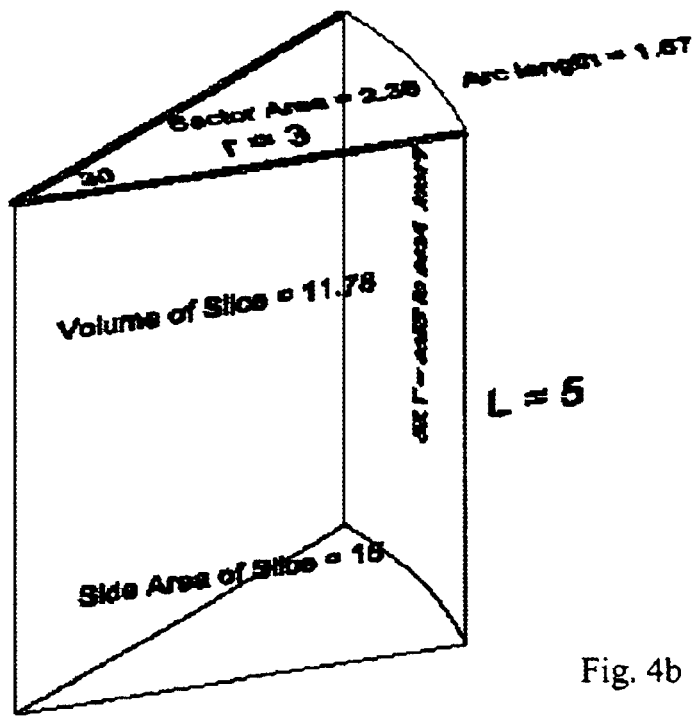
Figure 5A:
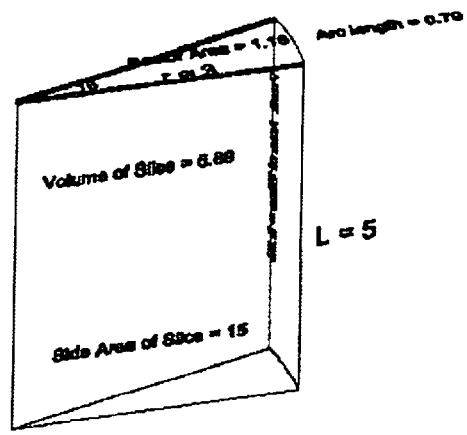
FIG. 5 is a plan view of four slices with angles of 15, 30, 45 and 90 degrees. Numerical values are given for each surface area, arc length, and volume for a radius of 3 and a length of 5 as examples.
Figure 5B:
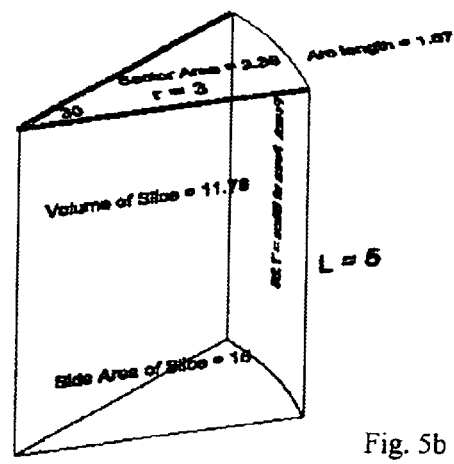
Figure 5C:
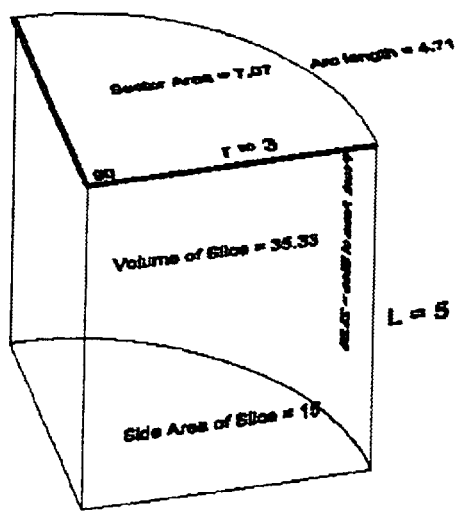
Figure 5D:
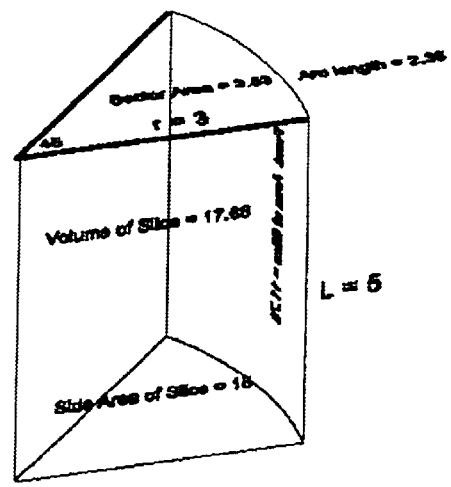
Figure 6A:
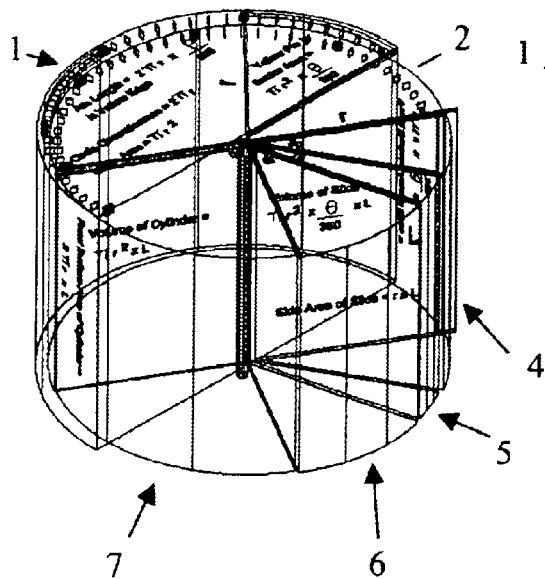
FIG. 6 is a plan view of the hollow outer half-cylinder and a solid inner half-cylinder with four slices attached to make a full 360 degree inner cylinder.
Figure 6B:
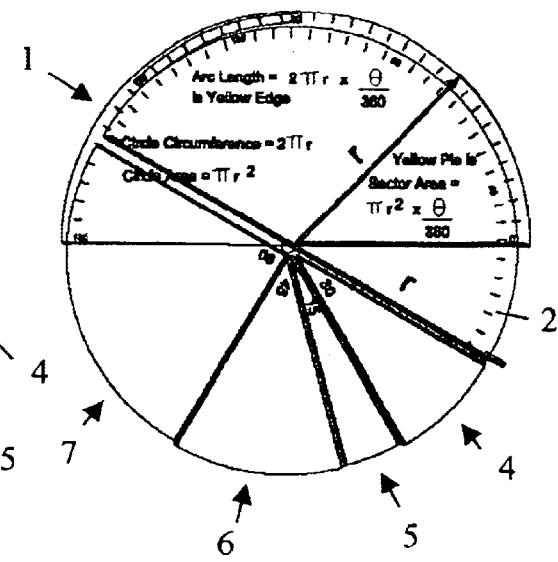
Figure 6C:
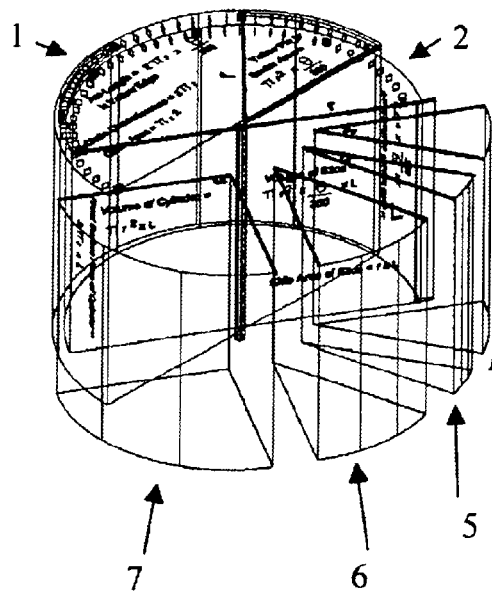
Figure 6D:
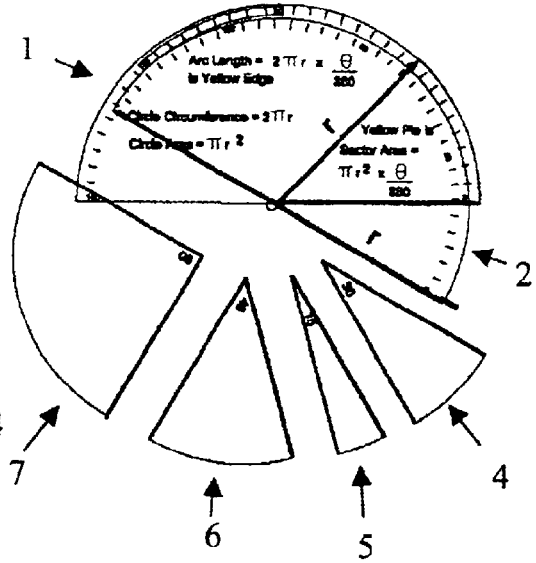

Referring to FIG. 3, the device includes a separate individual slice of the cylinder showing the equations for the volume of a slice, the front surface area of the slice, and the side surface area of the slice. The angle (θ) of the slice, the radius (r) and the height of the slice (L) are identified.

Referring to FIG. 5, the device includes separate individual slices at different angles and numerical values for the radius and height of the slice. The actual values of the arc length, the sector area, the volume of a slice, the front surface area of the slice, and the side surface area of the slice are given. Referring to FIG. 6, the individual slices can be attached to the inner half-cylinder to make a complete 360-degree cylinder.

Classroom activities can be developed using the present invention that will increase the level of understanding of the cylinder's geometry and the equations involved. One such activity involves revolving the inner cylinder to different angles. A slice of the cylinder is exposed allowing the arc length, the sector area, the volume of the slice, and the front and side surface areas of the slice to be calculated. Students can practice calculating the values of the arc length, the sector area, the volume of the slice, and the front and side surface areas by varying the amount of the slice that is exposed.

Another classroom activity involves reversing the activity above. The arc length, the sector area, the volume of the slice, the front surface area or the side surface areas is given and then the students must revolve the inner half-cylinder to the position that will make the slice with the correct values.

The individual slices can be used as models and help the students to internalize the meaning of the cylinder's surface areas and volume, its diameter and radius, the top circle circumference and area, the arc length, the sector area, the volume of a slice, the front area of the slice, the side area of the slice and the equations that go along with them.

Participating in these activities brings the level of learning and understanding of a cylinder and its geometry and equations to a conceptual level rather than just a fact remembering level as described in the Blooms Taxonomy.

I claim:

1. A device consisting of a hollow outer half-cylinder, and an inner half-cylinder that can rotate around a common center for both the inner and outer half-cylinders, wherein a top surface of the hollow outer half-cylinder and a top surface of the inner half cylinder can be rotated to form a circle's circumference, with individual slices that can be attached to the inner half cylinder making a complete 360-degrees cylinder, the hollow outer half-cylinder having marked off units around the 180 degrees of the hollow outer half-cylinder.

2. A device of claim 1, wherein the hollow outer half-cylinder show the equations for the circle's circumference and area, the arc length and sector area, the outer surface area of the cylinder and identifies the radius.

3. A device of claim 1, wherein the inner half-cylinder, has marked off units around the 180 degrees of the inner half-cylinder.

4. A device of claim 1, wherein the inner half-cylinder, show the equations for the volume of the cylinder and of a slice, the front surface area of the slice, and the side surface area of the slice and identifies the radius and height.

5. A device of claim 1, wherein the individual slice, show the equations for the volume of a slice, the front surface area of the slice, the side surface area of the slice and identifies the angle (θ) of the slice, the radius (r) and the height of the slice (L).

6. A device of claim 1, wherein the individual slices, have different angles and numerical values for the radius and height of the slice, the actual values of the arc length, the sector area, the volume of a slice, the front surface area of the slice, and the side surface area of the slice.

* * * * *